(12) United States Patent
Lim

(10) Patent No.: US 10,760,999 B2  
(45) Date of Patent: Sep. 1, 2020

(54) METHOD AND APPARATUS FOR TRANSFERRING A TISSUE SECTION USING A THERMOPLASTIC MATERIAL

(71) Applicant: Agilent Technologies, Inc., Santa Clara, CA (US)

(72) Inventor: Victor Lim, Pacifica, CA (US)

(73) Assignee: AGILENT TECHNOLOGIES, INC., Santa Clara, CA (US)

(*) Notice: Subject to any disclaimer, the term of this patent is extended or adjusted under 35 U.S.C. 154(b) by 264 days.

(21) Appl. No.: 15/882,479

(22) Filed: Jan. 29, 2018

(65) Prior Publication Data

US 2018/0246017 A1  Aug. 30, 2018

Related U.S. Application Data

(60) Provisional application No. 62/464,951, filed on Feb. 28, 2017.

(51) Int. Cl.

| | |
|---|---|
| *G01N 1/30* | (2006.01) |
| *G01N 1/28* | (2006.01) |
| *G01N 1/31* | (2006.01) |
| *G01N 1/00* | (2006.01) |

(52) U.S. Cl.
CPC .............. *G01N 1/30* (2013.01); *G01N 1/28* (2013.01); *G01N 1/2813* (2013.01); *G01N 1/312* (2013.01); *G01N 1/00* (2013.01); *G01N 2001/2833* (2013.01)

(58) Field of Classification Search
USPC .................. 436/174, 176; 422/109, 129, 536
See application file for complete search history.

(56) References Cited

U.S. PATENT DOCUMENTS

2018/0120207 A1* 5/2018 Lim .................. G01N 1/36

OTHER PUBLICATIONS

Gross, A. et al., "Technologies for Single-Cell Isolation," International Journal of Molecular Sciences, 2015, vol. 16, pp. 16897-16919.

* cited by examiner

*Primary Examiner* — Dean Kwak

(57) ABSTRACT

Methods and apparatus are provided for transfer of a tissue section from a first location to a second location. Thermoplastic material is applied to at least one pin of a tissue section transferring apparatus. The thermoplastic material contacts a tissue section while at least partially melted, and when it cools, substantially solid thermoplastic material holds the tissue section to the at least one pin. A tissue section transferring apparatus comprises a heater block, a heat source, and at least one pin attached to and extending from the heater block.

9 Claims, 2 Drawing Sheets

METHOD AND APPARATUS FOR TRANSFERRING A TISSUE SECTION USING A THERMOPLASTIC MATERIAL

CROSS-REFERENCE TO RELATED APPLICATIONS

This application claims the benefit of U.S. Provisional Patent Application No. 62/464,951, filed Feb. 28, 2017.

FIELD OF THE INVENTION

This invention relates to methods and apparatus for transfer of a tissue section from a first location to a second location.

BACKGROUND

Very thin, delicate tissue samples (known as tissue sections) are commonly to collected and prepared for analysis such as molecular testing or microscopy. Tissue sections are often obtained by slicing from a formalin fixed, paraffin embedded (FFPE) blocks of a tissue via a variety of methods. Some known methods include: (1) cutting sections of a tissue block using a microtome; (2) scraping a tissue sample off of a slide by using a razor blade; (3) identifying a portion of a tissue sample and macrodissecting this portion using a variety of suitable tools; or (4) performing laser-capture microdissection (LCM). For example, microtomes are used to cut extremely thin slices of tissue for microscopic observation under transmitted light or electron radiation. Microtomes use extremely sharp knives to slice thin tissue sections of a desired thickness from a sample. A thin tissue section may curl or forming a roll of tissue section. Steps may be taken to prevent the tissue section from forming a roll on a surface after being sliced. Such steps may be taken so that the tissue section can be placed on a microscope slide for observation.

Tissue sections can be retrieved from a slicing surface such as the knife plate of a microtome. The retrieval of the tissue section is usually done manually, such as by an operator using a grasping tool. The operator then may transfer to a slide or to a vessel for further processing. Because the tissue sections are extremely thin, with some having a few micron thickness, they may be difficult to collect and transfer without damage or contamination.

In many laboratories and tissue sectioning systems, the transferring process is a manual process. This can slow down the work flow process when preparing tissue sections for molecular testing. Another problem associated with manual processes is that the tissue samples can be contaminated during the transfer. Nonetheless, transfer of thin tissue sections is necessary for additional processing of the tissue, particularly if molecular testing is desired. It is often desirable to transfer a tissue section to a suitable container, such as a microcentrifuge tube, for processing such as removal of paraffin.

Laser-capture microdissection is described in more detail in Gross et al., "Technologies for Single-Cell Isolation", Int. J. Mol. Sci. 2015, 16(8), 16897-16919. A tissue section is observed through a microscope and the target cell or compartment is visually identified. The laser cuts the tissue and the isolated cell (or compartment) can be extracted. Contact-based extraction can be done via adhesion, employing adhesive tube caps or heat-absorbing transfer foils, locally made adhesive by infrared (IR) lasers. Contact-free gravity-assisted microdissection (GAM) uses an inversely mounted substrate placed over a collector tube. Once being cut out by the laser, the target cell (or compartment) falls down into the collector.

There remains a need for better tools and processes to improve the transferring tissue samples, particularly tissue sections which are very thin and delicate, without damage or contamination.

SUMMARY

Various embodiments of the present disclosure provide a tissue section transferring apparatus configured to transfer a sample from a first location to a second location using a thermoplastic material that is applied to at least one pin of the tissue section transferring apparatus. Various embodiments of the present disclosure provide methods for transferring a tissue section.

DETAILED DESCRIPTION

Figure 1:
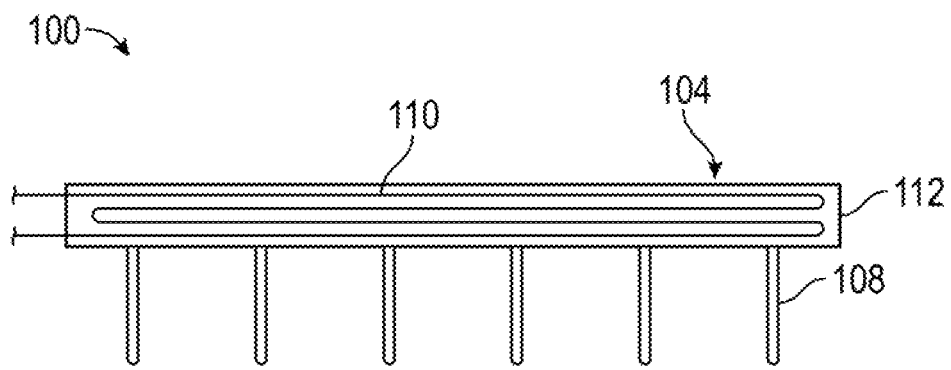
FIG. 1 is a front perspective view of one embodiment of a tissue section transferring apparatus of the present disclosure.

The present disclosure provides improved methods and apparatus for transferring a tissue section from a surface such as a cutting surface.

As one aspect, a method of transferring a tissue section is provided. The method comprises applying thermoplastic material to at least one pin of a tissue section transferring apparatus; contacting the thermoplastic material on the at least one pin with a tissue section while the thermoplastic material is at least partially melted; cooling the at least partially melted thermoplastic material by removing heat from the at least one pin so that the tissue section is held to the transferring apparatus by substantially solid thermoplastic material; transferring the tissue section to a second position by moving the transferring apparatus; and releasing the tissue section from the thermoplastic material by supplying heat to the substantially solid thermoplastic material via the from at least one pin so that the substantially solid thermoplastic material is at least partially melted.

As another aspect, an apparatus for transferring a tissue section is provided. The apparatus comprises a heater block which defines a heat source chamber. The apparatus also comprises a heat source in the heat source chamber. The apparatus comprises at least one pin attached to and extending from the heater block, and which is in thermal contact with the heat source. The heat source is configured to supply heat to the at least one pin to achieve a desired temperature.

In some embodiments of the present methods and apparatus, the thermoplastic material is applied to the at least one pin by heating the at least one pin to a temperature above a melting point of the thermoplastic material and contacting the heated at least one pin with a pool of the thermoplastic material. In some embodiments, the thermoplastic material is applied to the at least one pin by heating a pool of the thermoplastic material and contacting the at least one pin with the heated pool. In some embodiments, the thermoplastic material is applied to the at least one pin by depositing drops of liquid thermoplastic material onto a tip of the at least one pin.

A tissue section typically includes a tissue or other biological material, such as cells or cell components. The tissue section typically has an embedding medium that at least partially covers the tissue, such as paraffin. A tissue section may be a very thin slice from a tissue block, such as a FFPE block. In some embodiments of the present methods, the tissue section comprises an embedding medium that at least partially covers a tissue, and the melting point of the thermoplastic material is less than the melting point of the embedding medium. In some embodiments, the thermoplastic material and the embedding medium are both paraffin, and/or the melting point of the thermoplastic material is between about 40° C. and about 65° C.

In some embodiments, the tissue section is transferred to a second location which is inside a tube or other container, and the at least one pin attached to the tissue section is inserted into the tube before releasing the tissue section. The at least one pin can be heated before it is inserted into the tube or before it arrives at the second location, or heating of the at least one pin can begin while the tissue section is being moved. In some embodiments, the at least one pin attached to the tissue section is heated from ambient temperature to above the melting point of the thermoplastic material in 2 seconds or less, alternatively in 1 second or less, measured from when heat is initially supplied to the at least one pin, or from after the tissue section is transferred to a second location.

Referring now to FIG. 1, an embodiment of the tissue section transferring apparatus of the present disclosure is generally shown. The tissue section transferring apparatus 100 includes: (1) a heater block 104; (2) a heat source 110 inside the heater block; and (3) at least one pin 108 connected to and extending from the heater block 104. In certain embodiments, the tissue section transferring apparatus 100 of the present disclosure is automatically or manually movable longitudinally, laterally, rotationally, or a combination thereof, and comprises one or more means for such movement. It should be appreciated that in certain embodiments, the tissue section transferring apparatus 100 can be formed from two or more separately formed sections (such as halves) that are suitably connected. It should further be appreciated that in certain embodiments, the at least one pin 108 can be either removably connectable to or integrally connected to the heater block 104.

The heater block 104 includes a body 112 that is configured to support the at least one pin 108. The body 112 of the heater block 104 is also configured to partially support the heat source. More specifically, the body 112 defines a heat source chamber (not shown) that is configured to enable the heat source to be positioned in or through the heat source chamber.

The heater block 104 is made of a material that can: (1) transfer heat from the heater block 104 to other member(s) of the tissue section transferring apparatus 100, such as the at least one pin 108, and/or other member(s) that are used in conjunction with the tissue section transferring apparatus 100 of the present disclosure; and (2) resist corrosion due to fluids commonly used in the processing of tissue sections. In certain embodiments, the heater block 104 can be made of a metal, a combination of metals, or another suitable material(s), for example, stainless steel, aluminum, copper, or alloys thereof.

The heat source is configured to supply or provide heat to the tissue section transferring apparatus 100 of the present disclosure. In this embodiment, the heat source is configured to provide heat to the at least one pin 108 and/or other member(s) that are used in conjunction with the tissue section transferring apparatus 100. In certain embodiments, the heat source can be a nichrome wire (not shown). In such certain embodiments, when an electrical current is passed through the nichrome wire, heat is produced. It should be appreciated that the heat source can be another suitable member that provides heat to the tissue section transferring apparatus 100 of the present disclosure and/or other member(s) that are used in conjunction with the tissue section transferring apparatus 100. In certain embodiments, the heat source chamber and therefore the heat source is positioned directly adjacent to the at least one pin 108 to prevent significant heat loss when heat is transferred to the at least one pin 108. In alternative embodiments, the heat source can be supported by another suitable portion of the body 112 of the heater block 104. In such alternative embodiments, the heat source is positioned relative to the at least one pin 108 so that the heat source can provide a suitable amount of heat to the at least one pin 108 and/or other member(s) of the tissue section transferring apparatus 100 of the present disclosure. In some embodiments, the heater block 104 is adapted for achieving an elevated and/or reduced temperature very rapidly, such as within 2 seconds or less, or 1 second or less. The apparatus can be configured by setting a controller and/or selecting suitable materials for the pin so that the at least one pin achieves an elevated and/or reduced temperature from ambient temperature or from 25° C. very rapidly, such as within 2 seconds or less, or 1 second or less. This serves the purpose of rapidly collecting and releasing a tissue section.

Figure 2:
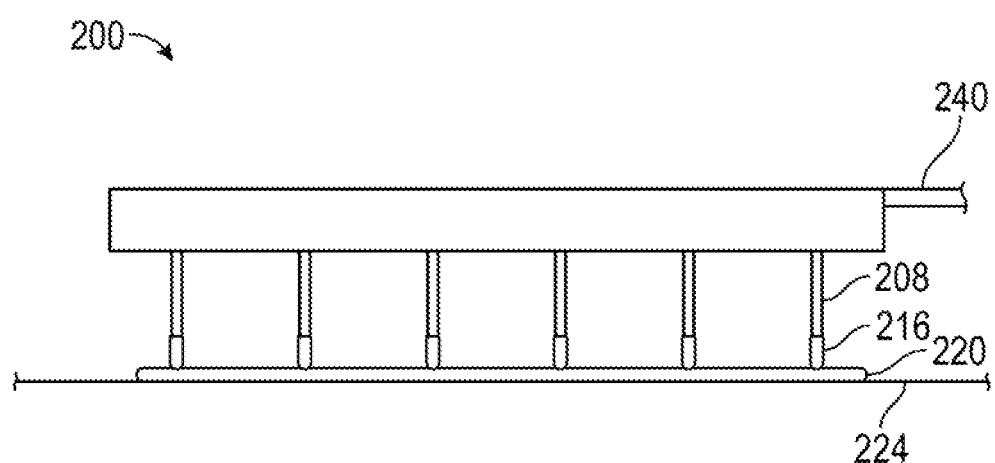
FIG. 2 is a front perspective view of the tissue section transferring apparatus of FIG. 1 adhering to a sample on a surface.
Figure 3:
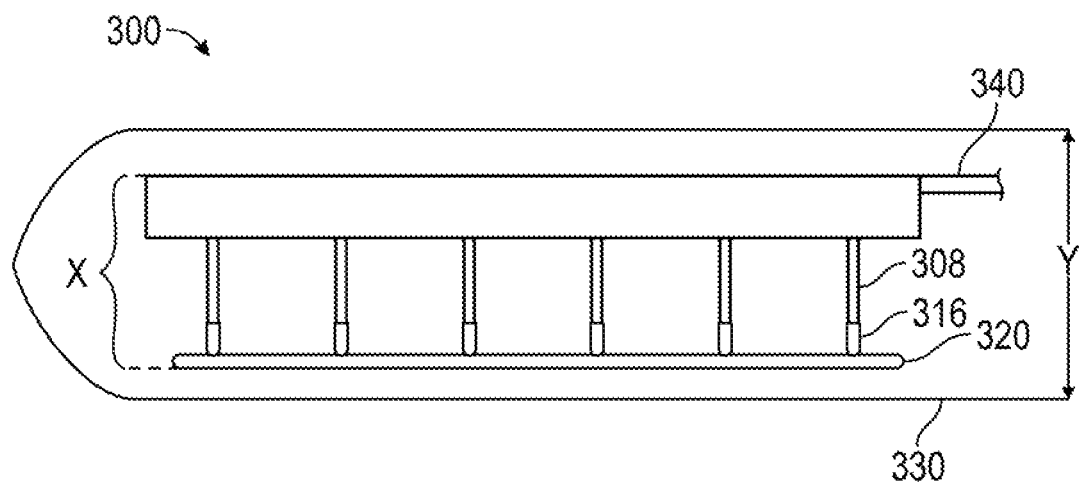
FIG. 3 is a front perspective view of the tissue section transferring apparatus of FIG. 1 transferring the sample of FIG. 2 into a centrifuge tube.

The at least one pin 108 can comprise a plurality of pins which are substantially parallel and substantially the same length, for example four to eight pins in a single column, spaced from about 1 mm to about 5 mm apart, alternatively about 3 mm apart, and spanning a distance between about 20 mm and about 30 mm, alternatively about 25 mm, from a first pin to a last pin of the plurality. The at least one pin 108 is generally cylindrically shaped. The at least one pin 108 is made of a metal or a combination of metals that can: (1) transfer heat from the at least one pin 108 to another member(s) of the tissue section transferring apparatus 100 of the present disclosure and/or other member(s) that are used in conjunction with the tissue section transferring apparatus 100; and (2) resist corrosion. In some embodiments, the at least one pin 108 comprises stainless steel. In alternate embodiments, the at least one pin 108 can comprise another suitable material. In certain embodiments and as shown in FIGS. 1-3, six pins 108 are connected to and extend from the heater block 104 of the tissue section transferring apparatus 100 of the present disclosure. It should be appreciated that in other embodiments, the tissue section transferring apparatus 100 can include one or more pins. In certain embodiments, the diameter of the at least one pin is from about 0.5 mm to about 2 mm, alternatively about 1 mm. In some embodiments, the diameter of the at least one pin can be greater than or less than 1 millimeter. Additionally, in some embodiments, the length of the at least one pin is from about 2 mm to about 6 mm, alternatively about 4 millimeters. In some embodiments, the at least one pin has a combination of one of those diameters and one of those lengths. In some embodiments, the at least one pin is solid and has a specific heat capacity of less than about 1 kJ/kg K, such as aluminum or alloy thereof, alternatively less than about 0.5 kJ/kg K, such as copper or alloy thereof.

In some embodiments, the tissue section transferring apparatus comprises a controller in communication with a heat source. The controller can comprise at least one processor. The controller is configured, or comprises a processor configured, to control the heat supplied to the at least one pin, and/or the controller is configured to obtain a temperature of the at least one pin and to maintain the desired temperature of the at least one pin in a range of 40° C. to 65° C. In some embodiments, a controller is in communication with the heat source, and the controller is configured, or comprises a processor configured, to control the heat supplied to the at least one pin.

In some embodiments, the tissue section transferring apparatus comprises an actuator connected to a heater block. The actuator can be configured, or comprises a processor configured, to provide automated motion of the heater block. The actuator can be configured to extend and retract the heater block, so that the heater block can be inserted into a tube of slightly larger diameter than the heater block. The apparatus can also include a tube holder, and the actuator can have a path between the surface and the tube holder, or is configured to move in such a path. The apparatus can include a controller in communication with the actuator, and the controller is configured to control movement of the actuator. This controller can be in addition to a controller in communication with a heat source, or a single controller can be in communication with a heat source and with an actuator.

In some embodiments, the tissue section transferring apparatus comprises a basin for holding a thermoplastic material. The apparatus can also include a tube holder, and the actuator has a path of automated motion between the surface and the tube holder. In some embodiments, the apparatus comprises a basin, an actuator and a controller, and the controller is configured for automated movement of the actuator between a sample surface and the tube holder.

Referring now to FIGS. 2 and 3, the tissue section transferring apparatus of the present disclosure is shown in operation. A thermoplastic material is applied to the at least one pin of the tissue section transferring apparatus so that the tissue section transferring apparatus can transfer a sample from a first location to a second location. In this embodiment, the sample is an FFPE tissue section cut from a tissue block.

More specifically, as shown in FIG. 2, the at least one pin 208 of the tissue section transferring apparatus 200 of the present disclosure is at least partially coated with a thermoplastic material 216, at least coated on its tissue-contacting surface. The thermoplastic material 216 is configured to adhere or connect to a sample 220 so that the tissue section transferring apparatus 200 can transfer the sample 220 from a first position (that being a surface 224 in this embodiment) to a second position, as further discussed below. In this embodiment, the thermoplastic material 216 is paraffin. It should be appreciated that the thermoplastic material 216 can be another suitable thermoplastic material or a combination of suitable thermoplastic materials in alternative embodiments. The thermoplastic material 216 is configured to at least partially melt when the thermoplastic material's 216 temperature rises to at least its melting point. The thermoplastic material 216 is also configured to at least partially solidify when the thermoplastic material's 216 average temperature falls below its melting point.

To apply the thermoplastic material 216 onto the at least one pin 208, the thermoplastic material 216 must be at least partially melted so that the at least partially melted or liquid thermoplastic material 216 can cover a portion of the at least one pin 208. The liquid thermoplastic material 216 then cools on the at least one pin 208 so that the thermoplastic material 216 can substantially solidify on the portion of the at least one pin 208. In some embodiments, the heater block 104 is passively cooled by reducing or stopping the current passing through it. In other embodiments, the heater block is actively cooled by a cooling fluid forced over its surface.

More particularly, the thermoplastic material 216 can be applied to the at least one pin 208 by: (1) heating the at least one pin 208 and moving the heated at least one pin 208 to the thermoplastic material 216 that is at room temperature so that the at least one pin 208 and the thermoplastic material 216 engage; (2) moving the at least one pin 208 that is at room temperature to a heated sample of liquid thermoplastic material 216 so that the at least one pin 208 and the heated thermoplastic material 216 engage; (3) depositing liquid thermoplastic material 216 onto the at least one pin 208 via a suitable apparatus that dispenses the liquid thermoplastic material; or (4) another suitable method. It should be appreciated that in these methods, the thermoplastic material 216 can alternatively be moved to the at least one pin 208 to engage the thermoplastic material 216 and the at least one pin 208.

In FIG. 2, the thermoplastic material 216 is applied to a distal end of the at least one pin 208. It should be appreciated that in alternative embodiments, the thermoplastic material 216 can be applied to another suitable portion(s) of the at least one pin 208. In embodiments that have more than one pin, the amount of thermoplastic material applied to the pins need not be the same amount to function properly, though in some embodiments substantially the same amount is applied to each pin 208.

Once the thermoplastic material 216 solidifies onto the at least one pin 208, the heat source supplies heat to the tissue section transferring apparatus 200, and particularly to the at least one pin 208 and the thermoplastic material 216 on the at least one pin 208. While the heat source supplies heat, the temperature of the at least one pin 208 increases. The temperature of the thermoplastic material 216 also increases. Once the temperature of the thermoplastic material 216 increases to at least its melting temperature, the thermoplastic material 216 at least partially melts. At such point, the tissue section transferring apparatus 200, and particularly the at least one pin 208 having the thermoplastic material 216, is moved toward the sample 220 on the surface 224. When the at least partially melted thermoplastic material 216 engages the sample 220, the at least partially melted thermoplastic material 216 adheres or attaches to the sample 220. At such point, the heat source reduces or stops the supply of heat to the at least one pin 208 and the thermoplastic material 216 on the at least one pin 208. In such case, heat is removed from the at least one pin 208, and therefore, the thermoplastic material 216. As heat is removed from the thermoplastic material 216, the temperature of the thermoplastic material 216 decreases. Once the temperature of the thermoplastic material 216 decreases below its melting point, the thermoplastic material 216 at least partially solidifies. In alternative embodiments, the sample 220 can be moved to the tissue section transferring apparatus 200, and particularly to the at least one pin 208 having the thermoplastic material 216, instead of or in addition to moving the tissue section transferring apparatus 200 to the sample 220.

Once enough heat is removed from the thermoplastic material 216, the thermoplastic material 216 is substantially solid. At such point, the thermoplastic material 216 is substantially attached to the sample 220. The tissue section transferring apparatus 200 can further transfer the sample 220 from the surface 224 to a second position.

Referring now to FIG. 3, the tissue section transferring apparatus 300 transfers the sample 320 to the second position. In certain embodiments and as shown in FIG. 3, the second position is inside a container, such as a centrifuge tube 330, reagent tube, or other container. As shown in FIG. 3, the tissue section transferring apparatus 300 is at least partially positioned in the centrifuge tube 330 such that the sample 320 is substantially positioned in the centrifuge tube 330. Once the sample 320 is substantially positioned in the centrifuge tube 330, the heat source supplies heat to the tissue section transferring apparatus 300, and particularly to the at least one pin 308 and the thermoplastic material 316 on the at least one pin 308. As heat is supplied to the thermoplastic material 316, the temperature of the thermoplastic material 316 increases. Once the temperature of the thermoplastic material 316 increases to at least its melting point, the thermoplastic material 316 at least partially melts. When the thermoplastic material 316 substantially melts, the sample 320 disconnects and is released from the thermoplastic material 316, and the sample 320 is deposited into the centrifuge tube 330. At such point, the heat source reduces or stops providing heat to the at least one pin 308 and the thermoplastic material 316 on the at least one pin 308 so that heat is removed from the at least one pin 308 and the thermoplastic material 316. Consequently, the temperature of the thermoplastic material 316 falls to at least its melting point, wherein the thermoplastic material 316 substantially solidifies.

Figure 4:
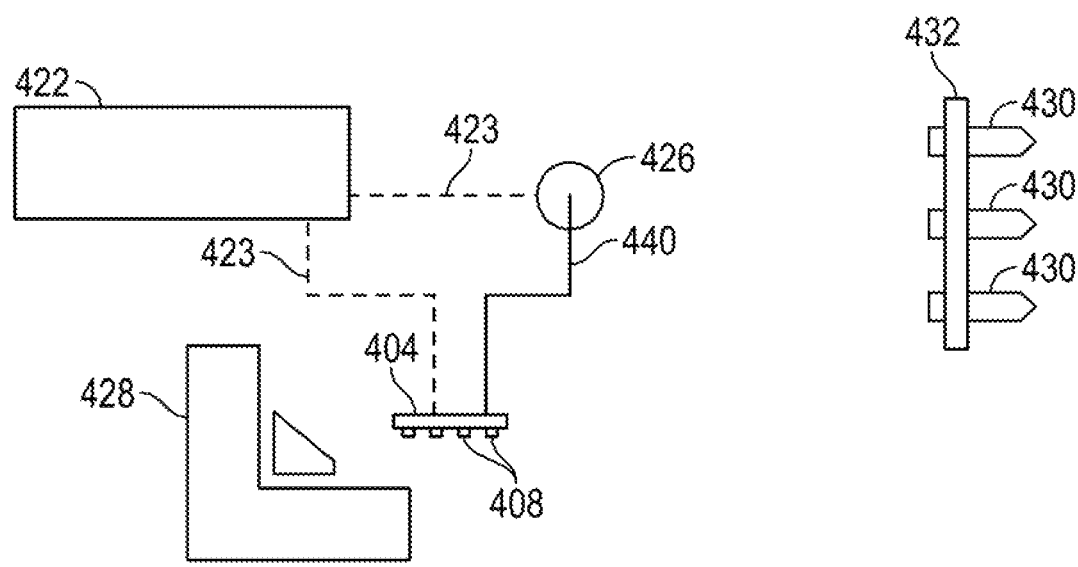
FIG. 4 is an illustrative view of a tissue section transferring apparatus that includes a controller and actuator.

Referring now to FIG. 4, a tissue section transferring apparatus comprising a controller 422 and actuator 426 is shown. The controller 422 can comprise at least one processor. The controller 422 is configured, or comprises a processor configured, to control the heat supplied to the at least one pin, and/or the controller is configured to obtain a temperature of the at least one pin and to maintain the desired temperature of the at least one pin in a range of 40° C. to 65° C. In some embodiments, a controller is in communication with the heat source, and the controller is configured, or comprises a processor configured, to control the heat supplied to the at least one pin. Dotted lines 423 in FIG. 4 indicate communication to and from the controller 422 to an actuator 426 and/or a heater block 404 including at least one pin 408 (similar to pins 108, 208, and 308 of FIGS. 1 to 3). The communication can be wired or wireless. The tissue section transferring apparatus of the present disclosure can be movable by a movable actuator 426 or arm 440 that is connected to the body of the heater block. The actuator 426 or arm 440 can be configured to automatically or manually move the tissue section transferring apparatus of the present disclosure longitudinally, laterally, rotationally, or a combination thereof. In some embodiments, the actuator 426 is configured to move the heater block 404 or an arm 440 attached to the heater block from a microtome 428 to a tube holder 432 configured for holding one or more sample tubes 430. FIG. 4 and the other figures are not drawn to scale.

In some embodiments, the melting point of the thermoplastic material can vary. However, it is preferred that the melting point of the thermoplastic material is less than the melting point of the embedding medium that at least partially covers the sample and that engages the thermoplastic material during the transferring process. For example, in this embodiment, the thermoplastic material, paraffin, applied to the pins has a preferred melting point of 40-65° C. A different paraffin material is used as the embedding medium that encases or at least partially covers the sample. In such case, the melting point of the paraffin (or other thermoplastic material) that is applied to the pins is less than the melting point of the paraffin (or other embedding medium) that at least partially covers the sample, such as by using different grades of paraffin. This can prevent the tissue from overheating and/or becoming contaminated during the transferring process.

It is preferred that the amount of heat applied to the tissue section transferring apparatus of the present disclosure not raise the thermoplastic material's temperature to a temperature where the thermoplastic material begins to burn or decompose.

It should be appreciated that in some embodiments, the tissue section transferring apparatus of the present disclosure can be movable by a movable actuator or arm (240 in FIG. 2 and 340 in FIG. 3) that is connected to the body of the heater block. The arm can be configured to automatically or manually move the tissue section transferring apparatus of the present disclosure longitudinally, laterally, rotationally, or a combination thereof.

In some embodiments, the thermoplastic material applied to the at least one pin of the tissue section transferring apparatus of the present disclosure can be consumable or disposable. It should further be appreciated that the thermoplastic material can be applied to and/or removed from the at least one pin of the tissue section transferring apparatus of the present disclosure one or more times.

It should further be appreciated that in certain embodiments, when the tissue section transferring apparatus of the present disclosure is transferring the sample from the first position to the second position, the width from one end of the heater block to one end of the sample (the letter X shown in FIG. 3), is smaller than the width of the opening of the container into which the sample is transferred (the letter Y shown in FIG. 3). In this embodiment, the width X is 9-10 millimeters and is smaller than the width Y. This allows the tissue section transferring apparatus of the present disclosure to transfer the sample into a container, such as the centrifuge tube 330 shown in FIG. 3. It should be appreciated that the width X can be more than 10 millimeters or less than 9 millimeters in alternative embodiments so that the tissue section transferring apparatus of the present disclosure can transfer a sample to a suitable container that has different dimensions than the centrifuge tube 330.

It should further be appreciated that in certain embodiments, after using the tissue section transferring apparatus of the present disclosure the thermoplastic material can be removed from the at least one pin by: (1) applying a solvent to the thermoplastic material; or (2) burning the thermoplastic material. It should further be appreciated that in alternative embodiments, neither of these two methods is performed to remove the thermoplastic material from the at least one pin. Instead, in such alternative embodiments, another suitable method is performed to remove the thermoplastic material from the at least one pin.

It should further be appreciated that in alternative embodiments, the tissue section transferring apparatus of the present disclosure or a portion thereof (such as pins or a heater block) can be configured to be removably connected to a suitable device. For example, in certain example embodiments, the tissue section transferring apparatus can be connected to a microtome. In such embodiments, the tissue section transferring apparatus can be configured to be automatically or manually movable longitudinally, laterally, rotationally, or a combination thereof, or all of the above.

It should further be appreciated that in alternative embodiments, the sample can be transferred from a blade that of a microtome, a microscope slide, or another suitable surface.

It should further be appreciated that in alternative embodiments, the sample can be transferred to another suitable container other than a centrifuge or reagent tube, a microscope slide, a table, or another suitable surface.

All of the references cited herein, including patents, patent applications, and publications, are hereby incorporated in their entireties by reference.

In the present disclosure, wherever the word "comprising" is found, it is contemplated that the words "consisting essentially of" or "consisting of" may be used in its place. Use of the singular includes the plural except where specifically indicated. Whenever the term "about" appears before a value, it should be understood that the specification is also providing a description of that value apart from the term "about", and vice versa.

In the present disclosure, any of the functions recited herein may be performed by one or more means for performing such functions. With respect to the processes described in the specification, it is intended that the specification also provides a description of the apparatus for performing those processes. With respect to the apparatus described in the specification, it is intended that the specification also provides a description of the components, parts, portions, of such apparatus.

Although the dependent claims have single dependencies in accordance with U.S. patent practice, each of the features in any of the dependent claims can be combined with each of the features of other dependent claims or the main claim.

It should be understood that various changes and modifications to the presently preferred embodiments described herein will be apparent to those skilled in the art. Such change and modifications can be made without departing from the spirit and scope of the present subject matter and without diminishing its intended advantages. It is therefore intended that such changes and modifications be covered by the appended claims.

I claim:

1. An apparatus for transferring a tissue section comprising:
   a heater block, the heater block defining a heat source chamber;
   a heat source in the heat source chamber;
   at least one pin attached to and extending from the heater block, the at least one pin comprises a thermoplastic material applied to at least a portion of the at least one pin,
   wherein the at least one pin is in thermal contact with the heat source; and
   a controller in communication with the heat source and the at least one pin, and the controller comprising at least one processor configured to control the heat supplied to the at least one pin,
   wherein the controller is configured to supply heat to the at least one pin to achieve a desired temperature range such that the at least one pin can transfer a tissue section from a first location to a second location.

2. The apparatus of claim 1, wherein the at least one pin comprises a plurality of pins which are substantially parallel and substantially the same length spaced from about 1 mm to about 5 mm apart, and spanning a distance between about 20 mm and about 30 mm from a first pin to a last pin of the plurality.

3. The apparatus of claim 1, wherein the at least one pin has a length in a range of from about 2 mm to about 6 mm and a diameter in a range of about 0.5 mm to about 2 mm.

4. The apparatus of claim 1, wherein the controller is configured to control the heat source so that the at least one pin achieves an elevated and/or reduced temperature from ambient temperature or from 25° C. within 2 seconds or less.

5. The apparatus of claim 1, further comprising an actuator connected to the heater block, wherein the actuator is configured, or comprises a processor configured, to provide automated motion of the heater block.

6. The apparatus of claim 5, further comprising a tube holder, and the actuator has a path between a sample surface of the tissue section and the tube holder.

7. The apparatus of claim 6, wherein the actuator is configured to extend and retract the heater block, so that the heater block can be inserted into a tube held by the tube holder, and wherein the tube has a slightly larger diameter than the heater block.

8. The apparatus of claim 5, further comprising the controller in communication with the actuator, and the controller is configured to control movement of the actuator.

9. The apparatus of claim 1, further comprising a basin for holding the thermoplastic material.

* * * * *